United States Patent [19]
Garrett

[11] 3,779,040
[45] Dec. 18, 1973

[54] VIBRATION DAMPENERS
[75] Inventor: William R. Garrett, Midland, Tex.
[73] Assignee: Smith International Inc., Midland, Tex.
[22] Filed: Nov. 8, 1971
[21] Appl. No.: 196,819

Related U.S. Application Data
[63] Continuation of Ser. No. 069,463, Sept. 3, 1970, which is a continuation of Ser. No. 815,856, April 14, 1969.

[52] U.S. Cl. ................. 64/27 NM, 173/57, 285/49
[51] Int. Cl. ............................................. F16d 3/14
[58] Field of Search ............ 64/27 F, 27 R, 27 NM; 77/29, 68; 173/57; 188/1 B; 285/49, 285, 286

[56] References Cited
UNITED STATES PATENTS
1,860,744  5/1932  Krotee............................ 64/27 NM
2,620,163  12/1952  Stone............................ 64/27 NM X
2,932,179  4/1960  Grant............................ 64/27 NM X

*Primary Examiner*—Duane A. Reger
*Attorney*—Murray Robinson et al.

[57] ABSTRACT

A vibration dampener may be used between the drill steel and power swivel of a boring machine. A plurality of sectors may be disposed side by side and connected to rings at their ends to form an annulus. Each sector may comprise a metal-rubber sandwich. The annulus may be used to provide means to transmit torque and compression. A pair of tubes with sealed telescopic connection therebetween and travel limit stops may be used to provide connection for transmitting tension and drilling fluid.

23 Claims, 7 Drawing Figures

INVENTOR.
William R. Garrett
BY
Murray Roberson
ATTORNEY

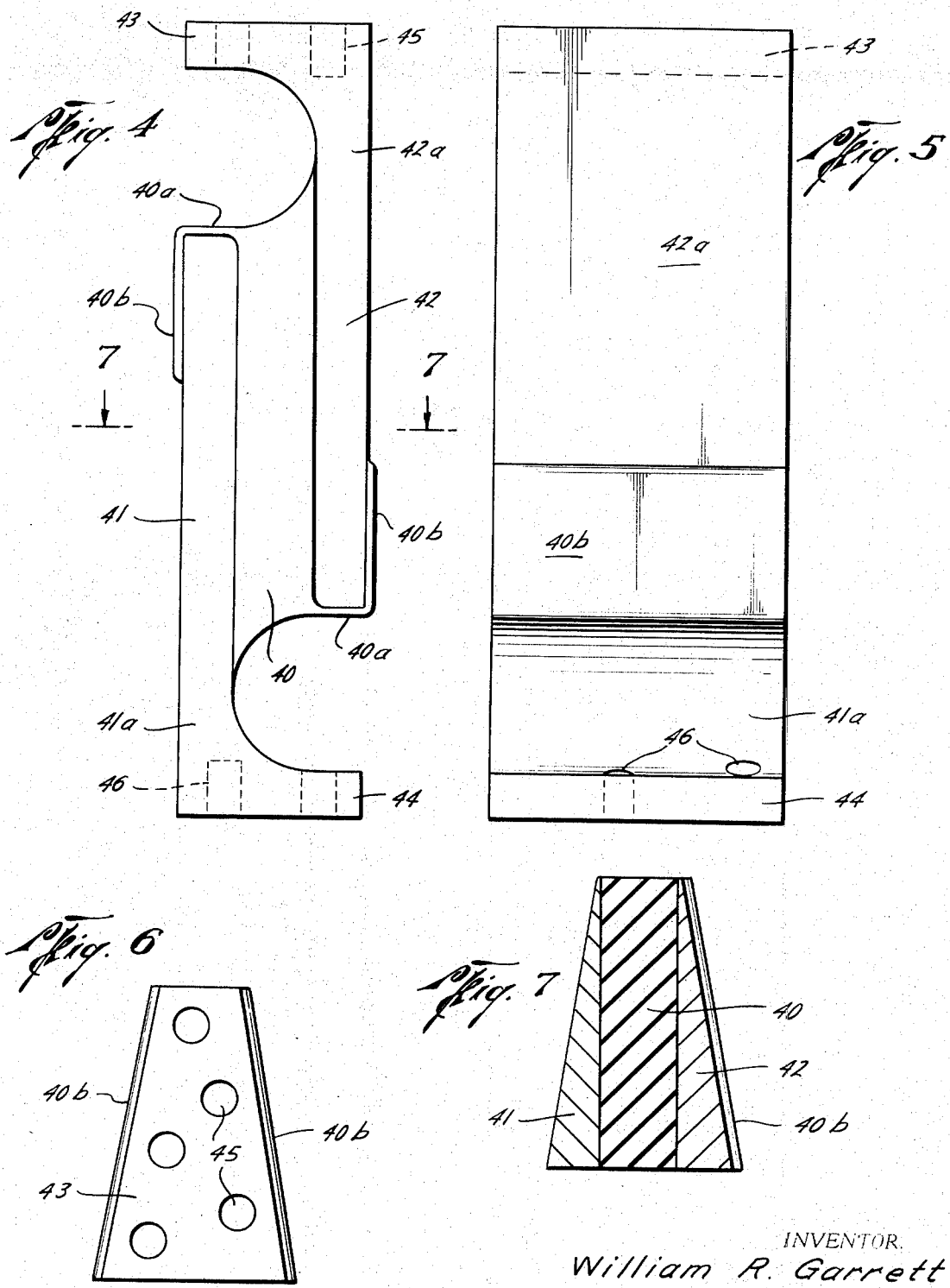

VIBRATION DAMPENERS

This is a continuation of U.S. Pat. application Ser. No. 69463 filed Sept. 3, 1970, which was a continuation of U.S. Pat. application Ser. No. 815,856, filed Apr. 14, 1969.

BACKGROUND OF THE INVENTION

1. Field of the Invention

This invention pertains to fluid conducting, rotary drill, vibration dampeners.

2. Discussion of the Prior Art

Vibration dampeners have heretofore been used in rotary drill srings used in deep well drilling, the vibration dampeners being placed between the drill bit and the string of drill collars used to weight the bit. Hole diameter places a severe limitation on any such down the hole tool. It has not heretofore been customary to use a vibration dampener for shallow hole boring. In such shallow boring there is not enough length of string to weight the bit sufficiently; accordingly pull down means reacting against the weight of the drilling machine is used. Since most of the downward force on the bit is applied above the power swivel or other rotary drive means, a vibration dampener placed above ground between the power swivel and the upper end of the drill steel serves to provide sufficient shock load protection for most of the apparatus.

SUMMARY OF THE INVENTION

According to the invention a vibration dampener may include a plurality of sectors disposed side by side and connected to rings at their ends to form an annulus, each sector comprising a metal, e.g. steel, elastomer, e.g. rubber, sandwich. Such an annulus may be used to provide means to transmit torque and compression and whatever bending movement there may be. Within the annulus may be disposed a tubular means to transmit fluid and tension. The tubular means may include two nipples connected in telescoping sealed relationship with stop means limiting axial separation of the nipples. The tubular means may be disposed inside the annulus and connected to it so that with the annulus rubber unstressed axially relative axial motion in either direction is permitted by the telescopic connections and travel limit stops. Stop means on each sandwich may be used to limit relative axial approach of the metal parts thereof, thereby limiting the strain on the rubber when the annulus is loaded in compression. Such travel limit stops on the tubular means limit the relative axial separation of the metal parts of each sandwich, thereby limiting the strain on the rubber when the dampener is loaded in tension. Abutment of the back of one sandwich with the face of the next limits transverse separation of the metal parts of each sandwich, thereby limiting the tensile strain on the rubber when the dampener is subjected to reverse torque. Other features of the invention pointed out in the claims can best be set forth in the following detailed description of a preferred embodiment of the invention.

BRIEF DESCRIPTION OF THE DRAWINGS

For a detailed description of a preferred embodiment of the invention reference will now be made to the accompanying drawings, but this is only exemplary of the invention which can be varied by one skilled in the art.

FIGS. 4–7 are respectively elevational, side top plan, and sectional views of one of the sectors used in the invention, the FIG. 7 section being taken at plane 7—7 of FIG. 4.

DESCRIPTION OF PREFERRED EMBODIMENT

Figure 1:
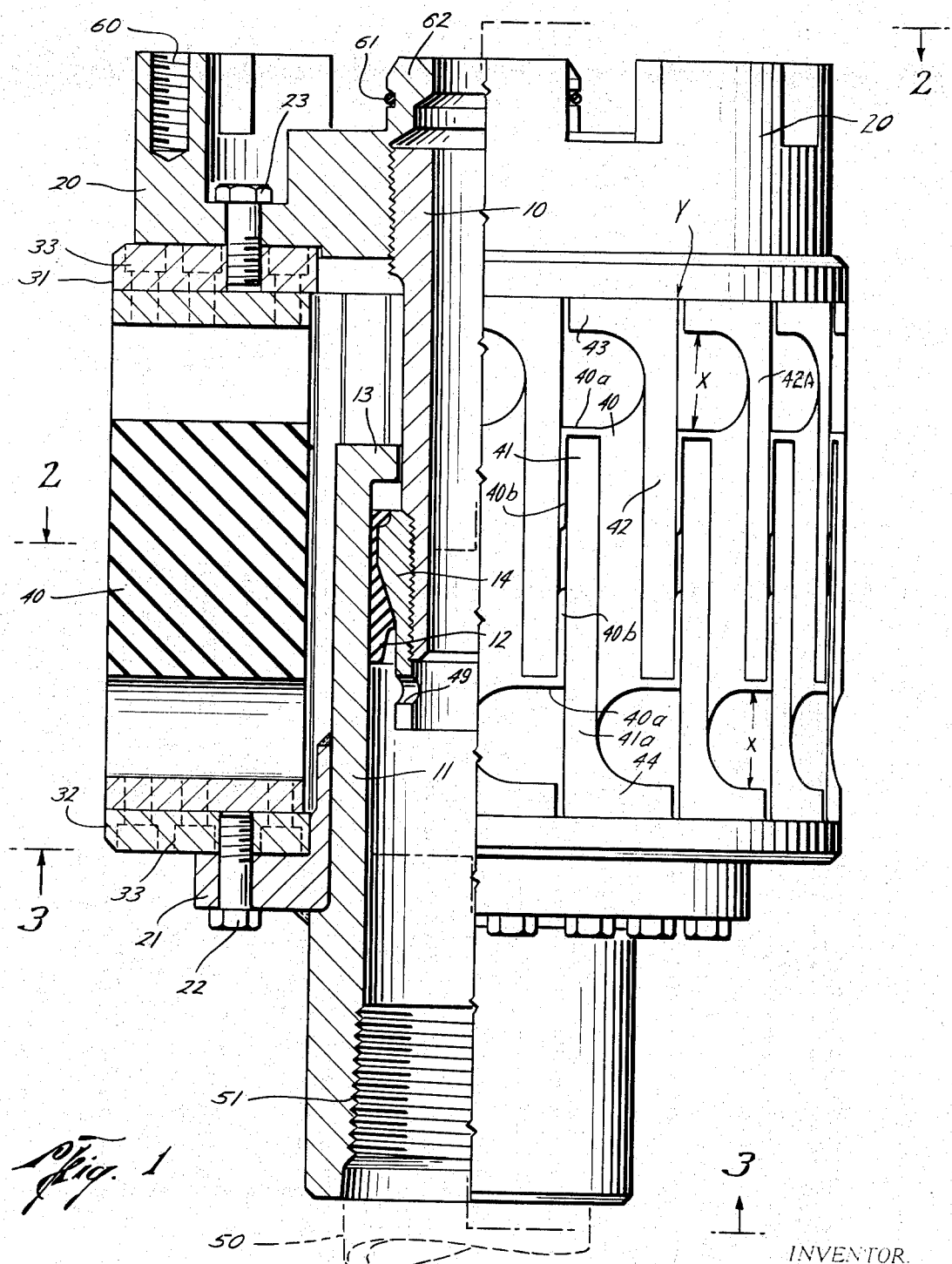
FIG. 1 is an axial section through a vibration dampener embodying the invention.

Referring to FIG. 1 there is shown a vibration dampener including an inner telescopic tubular means including an upper pipe nipple 10 and a lower pipe nipple 11. There is a rubber seal sleeve 12 bonded to nut 14 between the two nipples so that the tubular means provides a conduit for the air or other drilling fluid being used.

Further details of this type of seal are disclosed in U. S. Pat. No. 3,172,341. Seal 12 is designed to seal only against escape of fluid from within the telescopic connection and therefore corresponds to only half of one of the two way seals shown in said patent.

Flange 13 on pipe 11 engages seal nut 14 on pipe 10 to limit axial travel and take axial tension when travel limit is reached.

Flanges 20, 21 on the nipples 10, 11, are secured thereto by welding and screw threads, respectively, as shown, but could be formed integrally therewith. Screws 22, 23, secure the flanges to a resilient annulus concentrically disposed about the tubular means.

Figure 2:
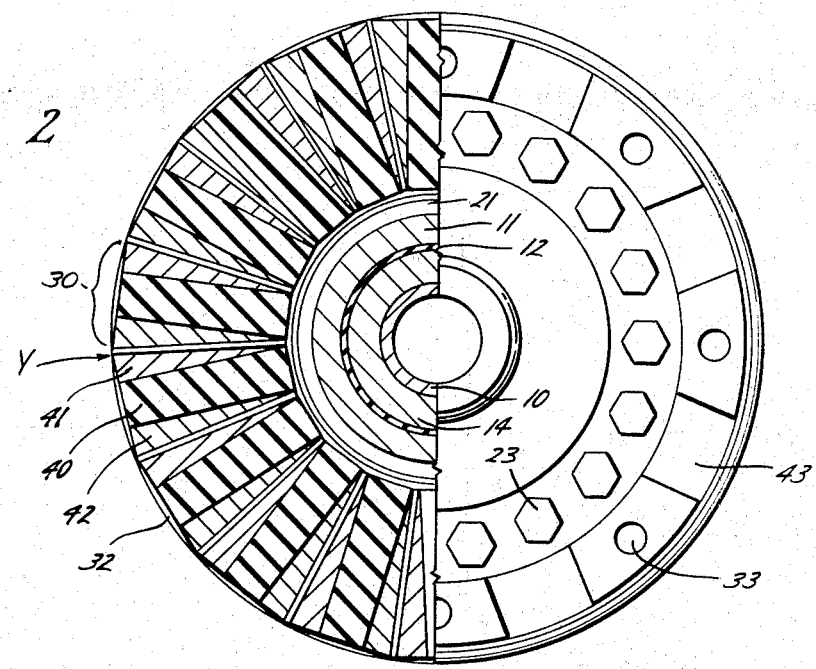
FIG. 2 is a top plan view, partly in section as indicated at 2—2 of FIG. 1.
Figure 3:
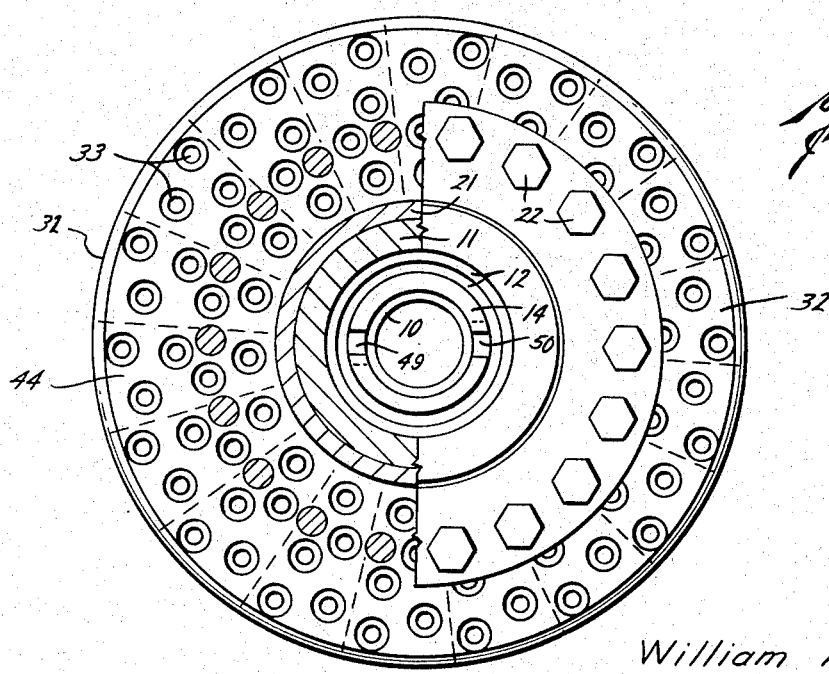
FIG. 3 is a bottom plan view, partly in section, as indicated at 3—3 of FIG. 1.

The resilient annulus, as shown in FIGS 2 and 3, comprises a plurality of sectors 30 disposed side by side. Rings 31, 32 at the upper and lower ends of the annulus are secured thereto by screws 33 (see also FIG. 1). The rings 31, 32 hold the sectors of the annulus together.

As best shown in FIGS. 4–7, each sector of the annulus is a rubber sandwich including rectangular cross-section block of rubber (or other elastomer) 40 between two vertical steel (or other metal) plates 41, 42, of triangular or trapezoidal cross-sections, one of the plates having an upward extension 42A beyond the rubber to a flange 43 at its upper end for connecting to ring 31 and the other plate having a downward extension 41A below the rubber to a flange 44 at its lower end for connecting to ring 32. Threaded holes 45, 46 in the flanges 43, 44, provide means for receiving screws 33. The extensions 41A, 42A, provide space X (see FIG. 1) for the plates to move vertically under axial compressive loading of the annulus before the plates strike the flanges 43, 44 which limit the axial compressive loading of the annulus.

The rubber 40 extends at 40A beyond the ends of the plates and extends at 40B part way over the sides of the sectors to prevent them from coming in metal to metal contact under heavy axial compressive loading of the annulus, and to absorb shock on reverse torque. During normal forward rotational driving, a space or gap will open up between the sectors at point Y.

The individual sectors 30 are made by bonding rubber 40 to plates 41, 42, placing the sector in a mold, and vulcanizing. The rubber will have a durometer hardness in the range of 45–75. The sectors are then screwed to rings 31, 32 to form the annulus. The pipe nipples 10, 11 are then inserted into the annulus, the flanges 20, 21 screwed on to pipe 10. Wrench sockets 49 facilitate screwing nut 14 onto the nipple 10. The make up is not as tight as between nipple 10 and flange 20.

A drill steel 50 may be screwed into the box 51 in pipe nipple 11 and a power swivel may be connected to flange 20 by screws going into holes 60. O-ring 61 on pin 62 provides means to seal to the power swivel.

In use, the power swivel normally drives the vibration dampener clockwise as viewed in FIG. 2. This causes it to open up in the resilient annulus at Y. However the tubular means inside the annulus provides a fluid tight conduit for the air, mud, oil, water, or other drilling fluid. Normally the fluid is air in the intended use of the apparatus but other fluids could be used. The apparatus is called a vibration dampener with reference to the repetitive small amplitude movements, both axial and torsional, transmitted by the vibration dampener at reduced amplitude from the drill steel to the power swivel during normal operation, but the apparatus also cushions the less frequent larger amplitude movements of the drill steel, reducing the amplitude thereof transmitted to the power swivel, and viewed in that light could be called a shock absorber.

The torque transmitted by the dampener is entirely through the annulus and due to the manner of construction of the sectors places the rubber in compression. On the other hand axial compressive loading of the dampener places the rubber of the annulus sectors in shear. If reverse torque (counterclockwise as viewed in FIG. 2) is applied to the dampener, or if the initial forward torque is suddenly released, the rubber leaves 40B prevent metal to metal impact between the metal plates of the sectors.

Axial compression of the dampener annulus is limited by engagement of the flanges 43 and 44 with the rubber pads 40A at the ends of the metal plates of the sectors. Axial tension on the dampener annulus is limited by the engagement of the flange 13 with seal nut 14.

The seal sleeve 12 slides axially inside and seals with nipple 14, the inner surface of which is smooth enough to form an air seal with the rubber sleeve. If the seal sleeve wears out, a new nut with new sleeve attached thereto can easily be substituted, or the old sleeve can be cut off and a new one bonded and vulcanized to the cut.

As noted previously, the various rubber elements of the annulus sectors could be replaced with other elastomeric material. The metal parts are preferably steel. The seal sleeve 12 could be made of other sealing material than rubber.

I claim:

1. A vibration dampener comprising tubular means to transmit axial tension and fluid including a first nipple, a second nipple axially aligned with the first nipple and axially movable relative thereto, and seal means providing a fluid tight passage through said tubular means from the first nipple to the second nipple, and a resilient annulus providing means to transmit tension, torque and axial compression disposed concentrically about the tubular means, said annulus including a plurality of sectors, each sector including metal plates with an elastomer connected therebetween, said nipples each being secured to said annulus.

2. Combination of claim 1 wherein said elastomer of each sector is bonded and vulcanized to the plates of the sector.

3. Combination of claim 1 including elastomer leaf means carried by each sector disposed between the sectors.

4. Combination of claim 1 wherein the plates of each sector extend axially in opposite directions beyond the elastomer therebetween, each plate having a transverse flange at the end thereof remote from the elastomer, said flanges cooperating with the opposite ends of said plates to limit relative axial approach of the plates.

5. Combination of claim 4 wherein there is an elastomer pad between each flange and the cooperating opposite plate end to prevent metal to metal contact therebetween.

6. Combination of claim 5 including elastomer leaf means carried by each sector disposed between the sectors, said pad means being continuous with said elastomer between said plates and said leaf means including portions on each plate continuous with one of said pads and extending only part way along the axial extent of the side of the metal plate.

7. Combination of claim 6 wherein said leaf means, pads, and the elastomer between the plates of each sector is bonded and vulcanized in place.

8. Combination of claim 4 wherein the annulus includes a ring at each end thereof, each of said flanges on said metal parts of each sector being screwed to the adjacent one of said rings.

9. Combination of claim 8 wherein each of said nipples includes a flange connected thereto and screwed to one of said rings.

10. Combination of claim 1 wherein the annulus includes a ring at each end thereof, a metal part of each sector being secured to one of said rings.

11. Combination of claim 10 wherein each of said nipples includes a flange connected thereto and secured to one of said rings.

12. Combination of claim 10 including connection means on each nipple for making connection with other parts of a drilling apparatus, the upper of said connection means being adapted for connection to a power swivel and including a pin and seal, the lower of said connection means including a threaded box adapted for connection to a drill steel.

13. Combination of claim 1 including stop means limiting separation of the nipples and wherein when the annulus elastomer is unstrained the stop means is in position to allow limited axial extension of said annulus.

14. Combination of claim 1 wherein the lower end of the uppermost nipple telescopically engages within the upper end of the lowermost nipple, and said seal means includes a nut screwed to the uppermost nipple and an elastomer seal bonded to the nut and axially slidably engaging the inside of the lowermost nipple.

15. Combination of claim 1 wherein in each sector the rubber between the plates is of rectangular cross-section and the plates are of trapezoidal cross-section.

16. Combination of claim 16 wherein the plates of each sector extend axially in opposite directions beyond the elastomer therebetween, each plate having a transverse flange at the end thereof remote from the elastomer, said flanges cooperating with the opposite ends of said plates to limit relative axial approach of the plates.

17. Combination of claim 16 wherein said elastomer of each sector is bonded and vulcanized to the plates of the sector.

18. Combination of claim 16 including elastomer leaf means carried by each sector disposed between the sectors.

19. Combination of claim 16 wherein the annulus includes a ring at each end thereof, each of said flanges on said metal parts of each sector being secured to the adjacent one of said rings.

20. Combination of claim 19 wherein each of said driving and driven members includes a flange connected thereto and secured to one of said rings.

21. Combination of claim 16 wherein the annulus includes a ring at each end thereof, a metal part of each sector being secured to one of said rings.

22. Combination of claim 21 wherein each of said driving and driven members includes a flange connected thereto and secured to one of said rings.

23. Combination of claim 16 wherein in each sector the rubber between the plates is of rectangular cross-section and the plates are of trapezoidal cross-section.

* * * * *